Patented June 15, 1937

2,084,136

UNITED STATES PATENT OFFICE 2,084,136

BARBITURIC ACID CONTAINING IN THE 5-POSITION A PYRIDINE GROUP AND METHOD OF PREPARING THE SAME

Rudolf Gebauer, Dresden, Germany, assignor to Chemische Fabrik von Heyden Aktiengesellschaft, Radebeul, near Dresden, Germany, a corporation of Germany No Drawing. Application June 2, 1934, Serial No. 728,673. In Germany June 3, 1933

9 Claims. (Cl. 260—33)

This invention concerns novel barbituric acids, and the process by which they are obtained; more particularly, these acids of my invention contain a pyridine group and an alkyl group which are directly linked to the 5-carbon atom in the 5-position.

While we already have in the prior art barbituric acids which are substituted in the 5-position by one or more organic radicals, barbituric acids have not been known heretofore, in which a pyridine radical is directly substituted in the 5-position.

Such novel compounds exhibit peculiar physiological effects, and in some instances they serve as bases for the synthesis of medical preparations of exceptional value.

I have discovered that C-monosubstituted barbituric acids may be reacted upon with halogenated pyridines or their derivatives in such a manner, that the halogen-atom fixed to the pyridine-nucleus combines with the 5-hydrogen-atom of the barbituric acid, causing hydrogen halide to be split off and the pyridine-group to be introduced into the barbituric acid molecule so as to form C,C-disubstituted barbituric acids.

Such C,C-disubstituted barbituric acids, which may also be further substituted at the nitrogen atoms, may be produced for instance by treating barbituric acids substituted in the 5-, the 1,5- or the 1,3,5-positions, with a suitable halogenated pyridine, at an elevated temperature, the split off hydrogen halide combining with a second molecule of the halogenated pyridine or being disposed of in any other way. The treatment at an elevated temperature may be effected in the presence of an inert solvent or by melting the ingredients together.

The invention is illustrated by the following examples, the parts being by weight if not specified otherwise. These examples serve to elucidate my invention; but they are not to be interpreted as limitations of the scope of my invention.

Example 1

From a solution of 80 parts of γ-bromopyridine-hydrochloride in 200 parts by volume of water, the free γ-bromo-pyridine is separated off by adding sodium carbonate solution and is dissolved in 300 parts by volume of xylol. The xylol-solution thus obtained is dried over calcium chloride and boiled with 28 parts of ethyl-barbituric acid under reflux until a red color crystalline mass has separated off. The xylol being decanted, the crystals are washed with ether, dried, thereafter dissolved in diluted hydrochloric acid, decolorized with carbon and filtered. Upon neutralizing the filtrate by adding sodium carbonate solution, the 5-γ-pyridyl-5-ethyl-barbituric acid is precipitated in good yield, which after recrystallization from water is obtained in white crystals, soluble in diluted acids and alkalis as well as in hot alcohol; but it is difficult to dissolve in ether, acetone, benzene and chloroform. By adding sodium ethylate solution to a hot alcoholic solution of the new acid, the sodium salt of the latter is precipitated, which readily dissolves in water.

Example 2

If in Example 1 the γ-chloro-pyridin is employed in place of the bromo-derivative, the same pyridyl-ethyl-barbituric acid is obtained, when operating in an analogous way.

Example 3

30 parts of ethyl-barbituric acid and 31 parts of γ-bromo-pyridine in 150 parts of dimethyl-aniline are heated at 150 to 160° C. for a quarter of one hour. Upon cooling the mass is treated with ether and shaken out with sodium carbonate solution. After acidifying the alkaline solution with acetic acid, a good crop of pyridyl-ethyl-barbituric acid separates out.

Example 4

Equal parts of γ-bromo-pyridine and 1-methyl-5-ethyl-barbituric acid are heated on a water bath until a homogeneous solution results. The temperature then rises spontaneously up to more than 100° C. and the whole mass solidifies. Upon cooling, water is added so as to form a solution. After adding sufficient hydrochloric acid to turn Congo-paper blue, the solution is treated with sodium hydro-sulphite and charcoal and then filtered. The filtrate is then made alkaline with sodium carbonate, shaken out with ether to remove resinous impurities and thereafter acidified by adding acetic acid. The 1-methyl-5-ethyl-5-γ-pyridyl-barbituric acid, thus being precipitated in good yield, melts at 150° C. when recrystallized from water.

Example 5

A mixture of 17 parts of ethyl-barbituric acid and 20 parts of 2-chloro-5-nitropyridine is heated to 210–230° C., wherewith hydrogen halide escapes. Upon cooling, the mass is dissolved in glacial acetic acid and filtered with charcoal. From the filtrate, a rich crop of 5-ethyl-5-nitro-pyridyl-barbituric acid crystallizes out, which has a melting point of 245° C. By reducing this new acid with stannous chloride and hydrochloric acid, the corresponding amino-compound is obtained, which melts at 270° C.

What I claim is:

1. A method of preparing barbituric acid derivatives of the general formula

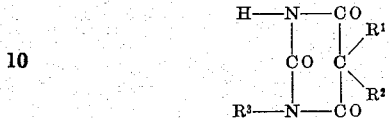

wherein $R^1$ is a pyridyl group, $R^2$ is a lower alkyl group and $R^3$ is a member of the group consisting of hydrogen and a lower alkyl radical, comprising heating the respective barbituric acids containing a hydrogen atom at the 5-carbon atom with halogenated pyridines.

2. A method of preparing barbituric acid derivatives of the general formula

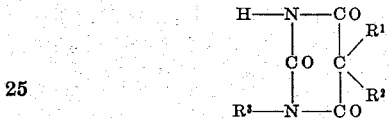

wherein $R^1$ is a pyridyl group, $R^2$ is a lower alkyl group, and $R^3$ is a member of the group consisting of hydrogen and a lower alkyl radical, comprising heating the respective barbituric acids containing a hydrogen atom at the 5-carbon atom in the presence of a solvent with halogenated pyridines.

3. A method of preparing barbituric acid derivatives of the general formula

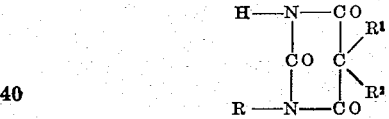

wherein $R^1$ is a pyridyl group, $R^2$ is a lower alkyl group, and $R^3$ is a member of the group consisting of hydrogen and a lower alkyl radical, comprising melting together the respective barbituric acids containing a hydrogen atom at the 5-carbon atom with halogenated pyridines.

4. A method of preparing barbituric acid derivatives of the general formula

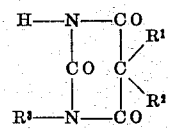

wherein $R^1$ is a pyridyl group, $R^2$ is a lower alkyl group, and $R^3$ is a member of the group consisting of hydrogen and a lower alkyl radical, comprising heating one molecule of the respective barbituric acids containing a hydrogen atom at the 5-carbon atom, with at least two molecules of a halogenated pyridine.

5. A method of preparing barbituric acid derivatives of the general formula

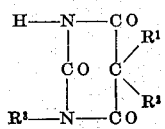

wherein $R^1$ is a pyridyl group, $R^2$ is a lower alkyl group, and $R^3$ is a member of the group consisting of hydrogen or a lower alkyl group, comprising heating one molecule of the respective barbituric acids containing a hydrogen atom at the 5-carbon atom, with halogenated pyridines in the presence of an agent able to combine with an acid.

6. As a new product, 5-ethyl-5-γ-pyridyl-barbituric acid.

7. As a new product, 1-methyl-5-ethyl-5-γ-pyridyl-barbituric acid.

8. As a new product, 5-ethyl-5-nitropyridyl-barbituric acid.

9. Barbituric acids of the general formula

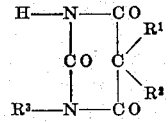

wherein $R^1$ is a pyridyl group, $R^2$ is a lower alkyl group, and $R^3$ is a member of the group consisting of hydrogen and a lower alkyl radical.

RUDOLF GEBAUER.